United States Patent
Feng et al.

(10) Patent No.: US 10,597,280 B2
(45) Date of Patent: Mar. 24, 2020

(54) SMART WATER DISPENSER AND CONTROL METHOD THEREOF

(71) Applicant: BOE TECHNOLOGY GROUP CO., LTD., Beijing (CN)

(72) Inventors: Feng Feng, Beijing (CN); Zhongwei Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/029,035

(22) Filed: Jul. 6, 2018

(65) Prior Publication Data
US 2019/0092615 A1 Mar. 28, 2019

(30) Foreign Application Priority Data
Sep. 26, 2017 (CN) .......................... 2017 1 0884815

(51) Int. Cl.
*B67D 1/08* (2006.01)
*G07F 9/02* (2006.01)
(Continued)

(52) U.S. Cl.
CPC ......... *B67D 1/0878* (2013.01); *B67D 1/0003* (2013.01); *F24D 17/00* (2013.01);
(Continued)

(58) Field of Classification Search
None
See application file for complete search history.

(56) References Cited

U.S. PATENT DOCUMENTS

| 2005/0150556 A1* | 7/2005 | Jonte ....................... E03C 1/057 137/613 |
| 2006/0130908 A1* | 6/2006 | Marty ..................... E03C 1/055 137/613 |

(Continued)

FOREIGN PATENT DOCUMENTS

| CN | 103110352 A | 5/2013 |
| CN | 103412527 A | 11/2013 |

(Continued)

OTHER PUBLICATIONS

First Chinese Office Action dated Apr. 18, 2019, received for corresponding Chinese Application No. 201710884815.4.

(Continued)

*Primary Examiner* — Ryan A Jarrett
(74) *Attorney, Agent, or Firm* — Kinney & Lange, P.A.

(57) ABSTRACT

Embodiments of the present disclosure provide a smart water dispenser and a control method thereof. The smart water dispenser includes: a mechanical switch, an electronic switch and a controller. The controller is configured to determine whether water usage is normal according to ON/OFF states of the mechanical and the electronic switches; if so, to indicate a water discharged volume detection unit to collect a water discharged volume; and otherwise, to turn off the electronic switch and transmit a play instruction to a voice playback unit. The control method includes: detecting states of the mechanical switch and the electronic switch in real time; determining whether the mechanical switch is in the ON state when the electronic switch is switched from the OFF state to the ON state; if so, turning off the electronic switch and outputting a prompt voice; and otherwise, collecting the water discharged volume when the mechanical switch is switched from the OFF state to the ON state.

15 Claims, 5 Drawing Sheets

(51) Int. Cl.
*G07F 15/04* (2006.01)
*F24D 17/00* (2006.01)
*G07F 13/06* (2006.01)
*G06Q 20/14* (2012.01)
*G07F 13/02* (2006.01)
*B67D 1/00* (2006.01)

(52) U.S. Cl.
CPC ........... *G06Q 20/145* (2013.01); *G07F 9/023* (2013.01); *G07F 9/026* (2013.01); *G07F 13/025* (2013.01); *G07F 13/065* (2013.01); *G07F 15/04* (2013.01)

(56) References Cited

U.S. PATENT DOCUMENTS

2011/0031331 A1* 2/2011 Klicpera ............... B05B 12/008
  239/71
2019/0086940 A1* 3/2019 Zhang ..................... G05D 9/00

FOREIGN PATENT DOCUMENTS

| CN | 203314760 U | 12/2013 |
| CN | 204459420 U | 7/2015 |
| CN | 105836944 A | 8/2016 |
| CN | 106284483 A | 1/2017 |
| CN | 206040535 U | 3/2017 |

OTHER PUBLICATIONS

International Search Report dated Apr. 10, 2019, received for corresponding Chinese Application No. 201710884815.4.

* cited by examiner

FIG. 7

SMART WATER DISPENSER AND CONTROL METHOD THEREOF

CROSS-REFERENCE TO RELATED APPLICATION(S)

This disclosure claims priority to Chinese Application No. 201710884815.4, entitled "SMART WATER DISPENSER AND CONTROL METHOD THEREOF" and filed on Sep. 26, 2017, which is incorporated herein by reference in its entirety.

TECHNICAL FIELD

The present disclosure relates to the field of electrical appliance technology, and in particular, to a smart water dispenser and a control method thereof.

BACKGROUND

Currently, water dispensers have gradually entered people's life, which have brought great convenience to people's daily lives. Meanwhile, the water dispensers also bring potential risks, among which a common potential risk is scalding, especially for families with children.

Traditional water dispensers usually use mechanical switches that facilitate water discharge, such as push-type or push-in type mechanical switches. If they are not turned off timely in use, overflow of hot water can scald users.

SUMMARY

An embodiment of the present disclosure provides a smart water dispenser including a mechanical switch and an electronic switch arranged on a water outlet pipeline, wherein the smart water dispenser further includes a controller, a mechanical switch detection unit and an electronic switch detection unit, wherein the mechanical switch detection unit is configured to detect an ON/OFF state of the mechanical switch, and transmit a detection result to a controller; the electronic switch detection unit is configured to detect an ON/OFF state of the electronic switch and transmit a detection result to a controller; and the controller connected to the electronic switch, the mechanical switch detection unit and the electronic switch detection unit, and configured to determine whether water usage is normal according to the ON/OFF states of the mechanical and the electronic switches; and to turn off the electronic switch if it is determined that the water usage is abnormal.

Alternatively, the controller includes a detection module, a determination module and a control module, wherein the detection module is connected to the mechanical switch detection unit and the electronic switch detection unit, respectively, and configured to receive the ON/OFF states transmitted by the mechanical switch detection unit and the electronic switch detection unit; the determination module is connected to the detection module and configured to determine whether the mechanical switch is in the ON state when the electronic switch is switched from the OFF state to the ON state; transmit an abnormal water usage instruction to the control module if it is determined that the mechanical switch is in the ON state; and if it is determined that the mechanical switch is in the OFF state, transmit a normal water usage instruction to the control module when the mechanical switch is switched from the OFF state to the ON state; and the control module is connected to the determination module and the electronic switch, and configured to turn off the electronic switch upon receiving the abnormal water usage instruction.

Alternatively, the smart water dispenser further includes: a fingerprint recognition unit connected to the determination module and configured to collect fingerprint data and transmit the collected fingerprint data to the determination module, wherein the determination module is configured to compare the collected fingerprint data with a pre-entered fingerprint template, transmit matching success information to the control module when the collected fingerprint data match the pre-entered fingerprint template, and transmit matching failure information to the control module when the collected fingerprint data do not match the pre-entered fingerprint template; and the control module is configured to activate the electronic switch upon receiving the matching success information, and transmit a play instruction upon receiving the matching failure information.

Alternatively, the control module is configured to indicate a water discharged volume detection unit to collect a water discharged volume upon receiving the normal water usage instruction.

Alternatively, the smart water dispenser further includes: the water discharged volume detection unit connected to the determination module, configured to collect a volume of water flowing through the water outlet pipeline in real time during a water discharge process as the water discharged volume, and transmit the water discharged volume to the determination module; wherein the determination module is connected to the water discharged volume detection unit and configured to compare the collected water discharged volume with a preset water discharged threshold, and transmit water getting completion information to the control module when the collected water discharged volume is greater than or equal to the water discharged threshold; and wherein the control module turns off the electronic switch upon receiving the water getting completion information.

Alternatively, the smart water dispenser further includes: an infrared detection unit connected to the determination module, configured to detect an actual distance between a user and the smart water dispenser in real time, and transmit the actual distance to the determination module, wherein the determination module is connected to the infrared detection unit and configured to compare the detected actual distance with a preset water getting distance, and determine whether the mechanical switch is in the ON state when the actual distance is greater than or equal to the water getting distance, and transmit leaving information to the control module if it is determined that the mechanical switch is in the ON state; and wherein the control module transmits a play instruction to a voice playback unit upon receiving the leaving information if the determination module determine that the mechanical switch is in the ON state.

Alternatively, the smart water dispenser further includes: a timer connected to the control module and configured to start upon receiving a timing instruction transmitted by the control module, and also connected to the determination module and configured to transmit an accumulated time to the determination module, wherein the determination module is configured to compare the accumulated time with a preset time threshold, and determine whether the electronic switch is turned on when the accumulated time is greater than or equal to the time threshold; and transmit delay information to the control module if it is determined that the electronic switch is turned on; and wherein the control module is configured to turn off the electronic switch upon receiving the delay information, and transmit the timing instruction to the timer when it is determined that the mechanical switch is switched from the ON state to the OFF state.

Alternatively, the controller is configured to transmit a play instruction to a voice playback unit if it is determined that the water usage is abnormal.

Another embodiment of the present disclosure provides a control method of a smart water dispenser, wherein the smart water dispenser includes a mechanical switch and an electronic switch arranged on a water outlet pipeline, the control method including: detecting states of the mechanical switch and the electronic switch in real time; determining whether the mechanical switch is in an ON state when the electronic switch is switched from an OFF state to an ON state; and turning off the electronic switch if it is determined that the mechanical switch is in the ON state.

Alternatively, before the states of the mechanical switch and the electronic switch are detected in real time, the control method further includes: activating the electronic switch by fingerprint recognition.

Alternatively, if it is determined that the mechanical switch is in an OFF state, the control method further includes: collecting a water discharged volume when the mechanical switch is switched from an OFF state to an ON state.

Alternatively, after the water discharged volume is collected, the control method further includes: turning off the electronic switch when it is determined that the water discharged volume reaches a preset water discharged threshold.

Alternatively, the control method further includes: determining whether the mechanical switch is in the ON state when it is determined that a user leaves the smart water dispenser; and outputting the prompt voice if it is determined that the mechanical switch is in the ON state.

Alternatively, after the water discharged volume is collected, the control method further includes: starting a timer when the mechanical switch is switched from the ON state to the OFF state; determining whether the electronic switch is in the ON state when it is determined that the timer counts up to a preset time threshold; and turning off the electronic switch if it is determined that the electronic switch is in the ON state.

Alternatively, the control method further includes: outputting a prompt voice if it is determined that the mechanical switch is in the ON state.

Additional features and advantages of the present disclosure will be set forth in the specification that follows, and in part will be apparent from the specification, or may be learned by implementation of the specification. The objects and other advantages of the present disclosure may be realized and attained by structures particularly indicated in the specification, claims as well as the accompany drawings.

BRIEF DESCRIPTION OF THE DRAWINGS

The accompanying drawings are used to provide further understanding of the technical solutions of the present disclosure, and constitute a part of the specification, which are used to explain the technical solutions of the present disclosure in conjunction with the embodiments of the present disclosure, and are not intended to limit the technical solutions of the present disclosure.

DETAILED DESCRIPTION

To make the objects, technical solutions, and advantages of the present disclosure clearer, the embodiments of the present disclosure will be described in detail with reference to the accompanying drawings. It should be noted that the embodiments of the present disclosure and features in the embodiments may be combined with each other arbitrarily in a case of no conflict.

In order to at least partially solve the technical defect that the water dispenser may easily scald, embodiments of the present disclosure provide a smart water dispenser and a control method thereof. According to the embodiments of the present disclosure, an electronic switch is introduced to ensure security of using the smart water dispenser by intelligent control, which may effectively reduce the risk of scald due to misoperation or improper use, and may minimize the possibility of persons, particularly children, being scalded.

The technical solutions of the embodiments of the present disclosure will be described in detail in connection with particular embodiments.

Figure 1:
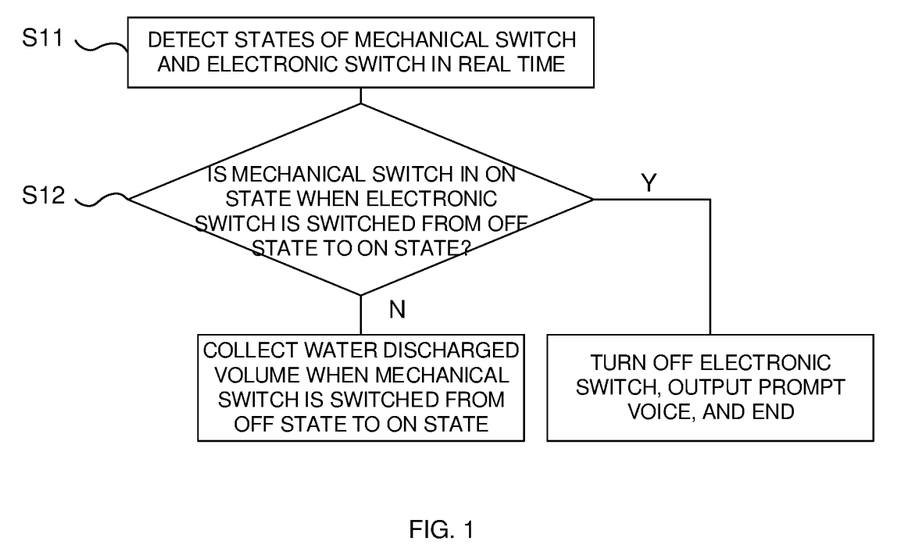
FIG. 1 is a flowchart of a control method of a smart water dispenser according to an embodiment of the present disclosure.

FIG. 1 is a flowchart of a control method of a smart water dispenser according to an embodiment of the present disclosure. A main structure of the smart water dispenser in this embodiment includes a water outlet pipeline and a mechanical switch and an electronic switch that are arranged on the water outlet pipeline. As shown in FIG. 1, the control method of the smart water dispenser in this embodiment includes:

S11 of detecting states of the mechanical switch and the electronic switch in real time;

S12 of determining whether the mechanical switch is in the ON state when the electronic switch is switched from an OFF state to an ON state; turning off the electronic switch and outputting a prompt voice if it is determined that the mechanical switch is in the ON state, then ending; and if it is determined that the mechanical switch is in the OFF state, collecting a water discharged volume when the mechanical switch is switched from the OFF state to the ON state.

In this embodiment, the smart water dispenser is further provided with a controller, a mechanical switch detection unit, an electronic switch detection unit, a water discharged volume detection unit and a voice playback unit. The electronic switch, the mechanical switch detection unit, the electronic switch detection unit, the water discharged volume detection unit and the voice playback unit are all connected to the controller. Among them, the mechanical switch detection unit is configured to detect an ON/OFF state of the mechanical switch, and transmit a detection result to the controller; the electronic switch detection unit is configured to detect an ON/OFF state of the electronic switch, and transmit a detection result to the controller; the water discharged volume detection unit is configured to collect a volume of water flowing through the water outlet pipeline; the voice playback unit is configured to play a preset prompt voice; the controller is configured to determine whether water usage is normal according to ON/OFF states of the mechanical and the electronic switches; to indicate the water discharged volume detection unit to collect a water discharged volume if it is determined that the water usage is normal; and to turn off the electronic switch to stop water discharging if it is determined that the water usage is abnormal.

Specifically, the electronic switch detection unit detects the state of the electronic switch in real time and transmits the state of the electronic switch to the controller. The mechanical switch detection unit detects the state of the mechanical switch in real time and transmits the state of the mechanical switch to the controller. When the electronic switch is switched from the OFF state to the ON state, the controller determines the state of the mechanical switch at this time. If the state of the mechanical switch at this time is an ON state, it is determined that the turn-on process is an abnormal water usage, and does not follow an order in which the electronic switch is turned on first and then the mechanical switch is turned on, then the electronic switch is directly turned off, and a prompt voice is output. If the state of the mechanical switch at this time is an OFF state, it is determined that the turn-on process is a normal water usage, the state of the mechanical switch is continuously detected, and when the mechanical switch is switched from the OFF state to the ON state, a collection instruction is transmitted to the water discharged volume detection unit, indicating the water discharged volume detection unit to start to collect the volume of discharged water.

In practical implementation, after the abnormal water usage is determined in step S12 in this embodiment, the current turn-on process may be ended, and after the user turns off the mechanical switch, the electronic switch may be turned on by the user to restart the above process. Alternatively, the state of the mechanical switch may be detected after the electronic switch is turned off and the prompt voice is output, and when the mechanical switch is switched from the ON state to the OFF state, the prompt voice output is stopped, and the electronic switch is turned on again; then, the user turns on the mechanical switch to achieve the normal water discharge. Wherein, the prompt voice "Mechanical Switch Is Not Turned Off" may be repeatedly played, prompting the user that the mechanical switch needs to be turned off. Upon receiving the prompt, the user turns off the mechanical switch.

The control method of the smart water dispenser in this embodiment ensures the security of using the smart water dispenser by introducing the electronic switch and intelligent control over the basic structure of the water dispenser. Specifically, by adding the electronic switch, both the electronic switch and the mechanical switch are arranged on the water outlet pipeline, so that the water may be discharged only if the electronic switch and the mechanical switch both are turned on, and the water discharge is stopped when any one of the switches is turned off during the water discharge process. Also, the electronic switch and the mechanical switch have a preset turn-on order, and the water may be discharged normally only with the order of turning on the electronic switch first and then the mechanical switch. Even if a child can touch the mechanical switch, the water will not be discharged due to the inconsistent turn-on order of the switches, ensuring that the hot water may not flow out easily and avoiding the possibility of children being scalded maximally. Further, in the case that an adult uses the water dispenser, there may be a situation where the mechanical switch is not turned off. Obviously, if the user does not have any precaution, the hot water being discharged directly is more likely to cause scald. In this embodiment, the states of the two switches are detected in real time, so that not only turning on the electronic switch is invalid in the case of the mechanical switch not being turned off, and there is no hot water flowing out, but also the user may be prompted to turn off the mechanical switch in time to ensure the security of the user.

Figure 2:
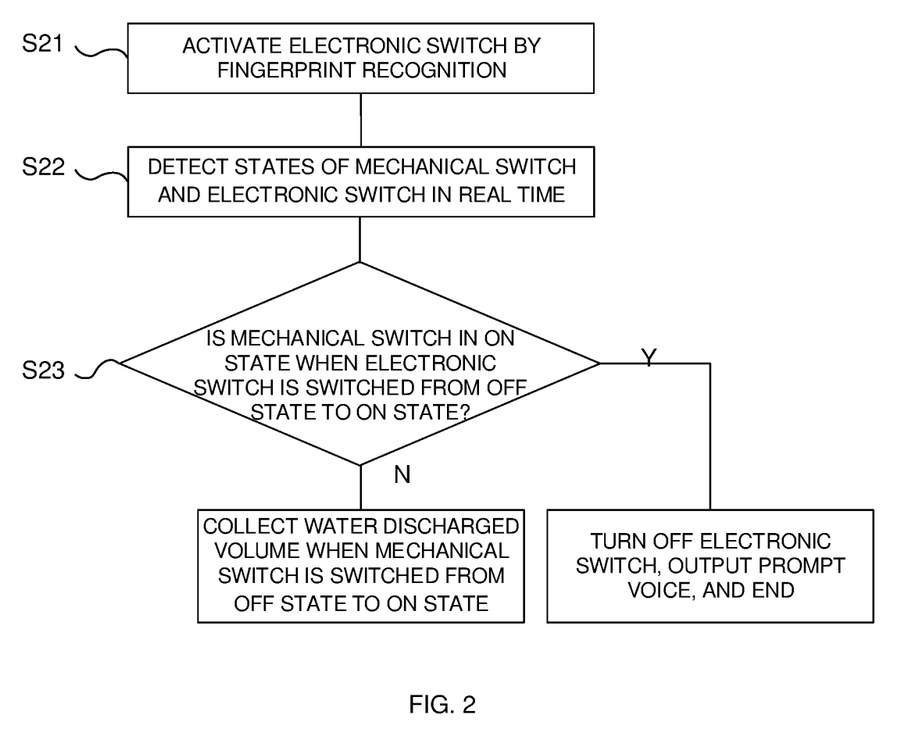
FIG. 2 is a flowchart of a control method of a smart water dispenser according to another embodiment of the present disclosure.

FIG. 2 is a flowchart of a control method of a smart water dispenser according to another embodiment of the present disclosure. As shown in FIG. 2, the control method of the smart water dispenser in this embodiment includes:

S21 of activating the electronic switch by fingerprint recognition;

S22 of detecting states of the mechanical switch and the electronic switch in real time;

S23 of determining whether the mechanical switch is in the ON state when the electronic switch is switched from an OFF state to an ON state; turning off the electronic switch and outputting a prompt voice if it is determined that the mechanical switch is in the ON state, then ending; and if it is determined that the mechanical switch is in the OFF state, collecting a water discharged volume when the mechanical switch is switched from the OFF state to the ON state.

According to another embodiment which is an extension of the foregoing embodiment of the control method, the smart water dispenser is further provided with a fingerprint recognition unit, which is connected to the controller. When a finger presses on the fingerprint recognition unit, the fingerprint recognition unit collects fingerprint data of the finger and transmits the collected fingerprint data to the controller. The controller compares the collected fingerprint data with a pre-entered fingerprint template, and transmits an activation instruction to the electronic switch when the collected fingerprint data match the pre-entered fingerprint template, and the electronic switch switches from a sleep mode to a working mode.

In this embodiment, the electronic switch is configured to have two modes: the sleep mode and the working mode. When the electronic switch is powered on, the electronic switch is in an initial sleep mode. In this mode, the electronic switch is in an invalid state, the user cannot turn on the electronic switch by pressing an ON/OFF button. The electronic switch is switched to the working mode only if the controller transmits the activation command to the electronic switch. In the working mode, the electronic switch is in a valid state, the user may turn on or off the electronic switch by pressing the ON/OFF button. Before using the smart water dispenser, the fingerprint data of the adults of the family members may be pre-entered by the fingerprint recognition unit and are stored as the fingerprint template in the controller. Therefore, only if an adult presses on the fingerprint recognition unit, the matching can be successful, and the electronic switch can be activated. When the child presses on the fingerprint recognition unit or presses the ON/OFF button, the electronic switch maintains in the sleep mode, and the water outlet does not discharge water. In addition, the smart water dispenser may also be provided with an alarm device, such as a buzzer or an alarm light. When the controller determines that the collected fingerprint data do not match the pre-entered fingerprint template, it transmits an alarm instruction to the alarm device, and the alarm device issues an alarm, prompting parents to check it out.

In this embodiment, the smart water dispenser is further provided with a communication module. The communication module is configured to establish a communication connection with the user's mobile terminal, so that the user may set the controller by the mobile terminal accordingly. For example, the controller is set to a fingerprint entry mode for entering the fingerprint data of the adults of the family members. For another example, the controller is set to a fingerprint comparison mode to determine whether the fingerprint of the finger pressing on the fingerprint recognition unit is matched or not. For yet another example, the controller is set to configure corresponding parameters of the smart water dispenser.

In actual implementations, the fingerprint recognition unit may operate in conjunction with the working state of the control panel. For example, after powered on, the control panel enters the sleep state. The control panel is activated by the fingerprint recognition unit before being used, and a power indicator light is on. The control panel may also be controlled to enter the sleep mode by the fingerprint recognition unit. If there is no operation for a long time, the control panel will enter the sleep state again, and the next operation needs to be activated by the fingerprint recognition unit. In this way, it may prevent mistakenly operating the control panel by children.

In this embodiment, difficulty of manipulation is increased by setting the fingerprint recognition unit and setting the electronic switch to operate in the sleep mode or the working mode, which effectively prevents the children from mistakenly operating the smart water dispenser, and minimizes the probability of the children being scalded.

Figure 3:
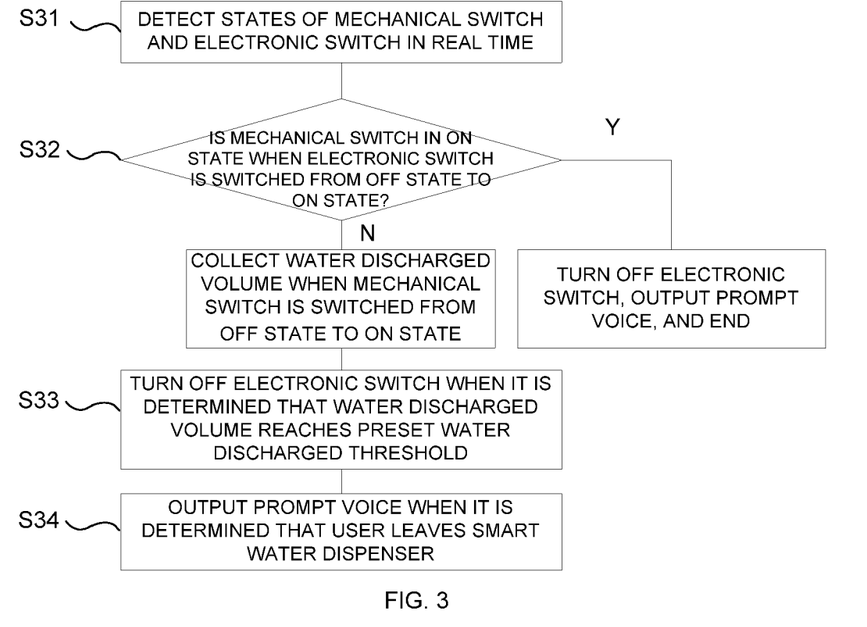
FIG. 3 is a flowchart of a control method of a smart water dispenser according to another embodiment of the present disclosure.

FIG. 3 is a flowchart of a control method of a smart water dispenser according to yet another embodiment of the present disclosure. As shown in FIG. 3, the control method of the smart water dispenser in this embodiment includes:

S31 of detecting states of the mechanical switch and the electronic switch in real time.

S32 of determining whether the mechanical switch is in the ON state when the electronic switch is switched from an OFF state to an ON state; turning off the electronic switch and outputting a prompt voice if it is determined that the mechanical switch is in the ON state, then ending; and if it is determined that the mechanical switch is in the OFF state, collecting a water discharged volume when the mechanical switch is switched from the OFF state to the ON state.

S33 of turning off the electronic switch when it is determined that the water discharged volume reaches a preset water discharged threshold.

S34 of determining whether the mechanical switch is in the ON state when it is determined that a user leaves the smart water dispenser; and outputting the prompt voice if it is determined that the mechanical switch is in the ON state.

According to another embodiment which is an extension of the foregoing embodiments of the control method, the smart water dispenser is further provided with an infrared detection unit. The infrared detection unit is arranged on the body for detecting whether the user leaves the smart water dispenser. The infrared detection unit is connected to the controller.

In this embodiment, the user may preset the water discharged threshold according to specifications of the cups in the home, a normal usage volume, and the like, and transmit the configuration information such as the water discharged threshold to the controller for storage. In the water discharging process, the water discharged volume detection unit collects the volume of discharged water in real time and transmits the water discharged volume information to the controller. Upon receiving the water discharged volume information, the controller compares the collected water discharged volume information with the preset water discharged threshold, and transmits a turn-off instruction to the electronic switch when the collected water discharged volume reaches the water discharged threshold. The electronic switch turns off upon receiving the turn-off instruction, and the water discharging is stopped.

In this embodiment, the user may preset the water getting distance according to usage habits and the like, and transmit the configuration information such as the water getting distance to the controller for storage. In the process of getting water, the infrared detection unit detects an actual distance between the user and the smart water dispenser in real time, and transmits the actual distance to the controller. When the controller receives the actual distance, it compares the actual distance with the preset water getting distance. When the actual distance is less than the water getting distance, it shows that the user is still near the smart water dispenser, and the water getting is not completed. When the actual distance is greater than or equal to the water getting distance, it shows that the water getting has been completed, and the user is leaving. At this time, the controller further determines whether the mechanical switch is in the ON state, and transmits the play instruction to the voice playback unit if it is determined that the mechanical switch is in the ON state. Upon receiving the play instruction, the voice playback unit starts to play the prompt voice, for example, repeatedly playing "Mechanical Switch Is not Turned Off", prompting the user to turn off the mechanical switch in time.

In this embodiment, control of the water discharged volume is achieved by setting the water discharged threshold, which may prevent overflow of the hot water caused by the user's negligence and may also avoid overflow of the hot water caused by the switch being not turned off in time. Meanwhile, by configuring the infrared detection unit, successful turn-off of the mechanical switch may be achieved, which eliminates the potential security risk caused by the user's negligence.

In order to prevent overflow of the hot water, although the water discharged threshold is set in this embodiment, the user may turn off the electronic switch at any time during the water getting process, that is, stopping the water discharging before the controller transmits the turn-off command to the electronic switch. In this case, the user may also forget to turn off the mechanical switch. Therefore, the solution of this embodiment is also applicable to the situation that the user turns off the electronic switch. That is, step S33 may be turning off the electronic switch by the user.

In actual implementations, the solution of this embodiment may be combined with the foregoing embodiments. For example, in this embodiment, a communication module is provided, and the user may establish a communication connection with the communication module by the mobile terminal, and set the water discharged threshold and the water getting distance in the controller. Meanwhile, the content of the prompt voices and the number of playing may be set by the mobile terminal through the communication module. For another example, the fingerprint recognition unit is provided on the controller of this embodiment, so that the controller may recognize the user, and thus different water discharged thresholds may be set for different users, thereby improving the user experience. Further, the controller may record the water discharged volume each time, and adjust the water discharged threshold for the user based on statistics of the volumes of water discharged for a period of time, so as to satisfy requirements of different users. Or, the single-chip microcomputer only records the last water discharged volume, and uses the previous water discharged volume as the water discharged threshold to control the current water discharged volume, avoiding the trouble for the user to repeat the operation.

Figure 4:
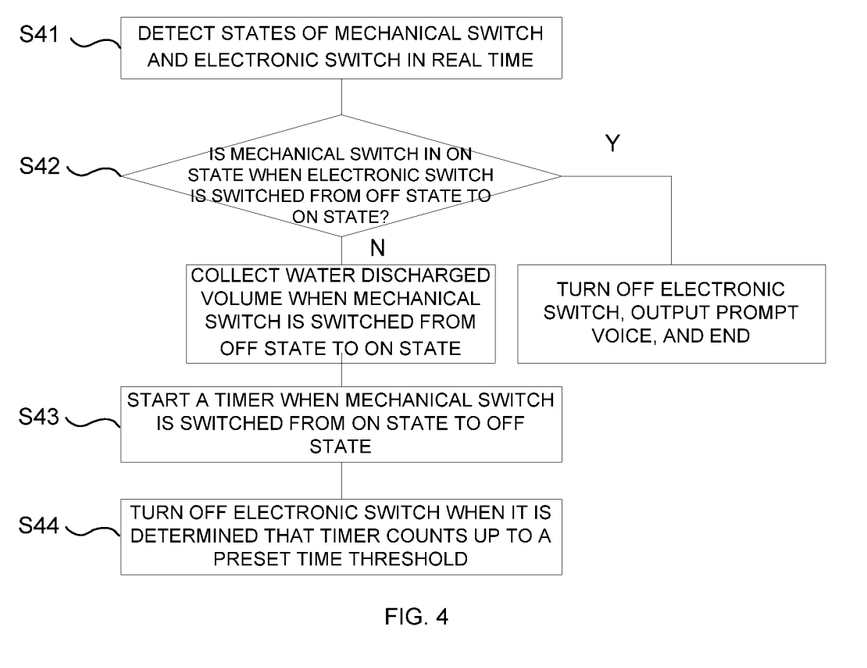
FIG. 4 is a flowchart of a control method of a smart water dispenser according to another embodiment of the present disclosure.

FIG. 4 is a flowchart of a control method of a smart water dispenser according to another embodiment of the present disclosure. As shown in FIG. 4, the control method of the smart water dispenser in this embodiment includes:

S41 of detecting states of the mechanical switch and the electronic switch in real time;

S42 of determining whether the mechanical switch is in the ON state when the electronic switch is switched from an OFF state to an ON state; turning off the electronic switch and outputting a prompt voice if it is determined that the mechanical switch is in the ON state, then ending; and if it is determined that the mechanical switch is in the OFF state, collecting a water discharged volume when the mechanical switch is switched from the OFF state to the ON state.

S43 of starting a timer when the mechanical switch is switched from the ON state to the OFF state;

S44 of determining whether the electronic switch is in the ON state when it is determined that the timer counts up to a preset time threshold; and turning off the electronic switch if it is determined that the mechanical switch is in the ON state.

According to another embodiment which is an extension of the foregoing embodiments of the control method, the smart water dispenser is also provided with a timer. The timer is connected to the controller and configured to accumulate the time elapsed after the mechanical switch is turned off, and transmit the accumulated time to the controller.

In this embodiment, the user may preset a time threshold according to the water getting habits and the like, and transmit the time threshold to the controller for storage. When the user turns off the mechanical switch, that is, it detects that the mechanical switch is switched from the ON state to the OFF state, the timer starts, and transmits the timing result to the controller. Upon receiving the timing result, the controller compares the timing result with the preset time threshold. When the timing result is less than the time threshold, it shows that the user has not completed the water getting, and the user may still want to continue to get water; when the timing result is greater than or equal to the time threshold, it shows that the water getting has been completed, and the user has left. At this time, the controller further determines whether the electronic switch is in the ON state or not, and transmits the turn-off instruction to the electronic switch if it is determined that the electronic switch is in the ON state. The electronic switch turns off upon receiving the turn-off instruction.

Since the user needs to turn on the electronic switch first and then turn on the mechanical switch when the user gets water, the user is likely to focus on the mechanical switch. Especially when the user is in a hurry, if he realizes that the water discharging has stopped after the mechanical switch is turned off, it is easy for him to forget to turn off the electronic switch. In this embodiment, the electronic switch is automatically turned off by setting the timer. When the mechanical switch has been off for more than a predetermined time, the electronic switch is automatically turned off. On one hand, the operation of the user turning off the electronic switch may be simplified, and on the other hand, the potential security risk caused by the user's negligence may be prevented.

In actual implementations, the solution of this embodiment may be combined with the foregoing embodiments. For example, the smart water dispenser is provided with the infrared detection unit, and the water getting distance is set in the controller. Step S44 in this embodiment may also include: determining whether the user leaves the smart water dispenser, determining whether the electronic switch is in the ON state, and turning off the electronic switch if it is determined that the electronic switch is in the ON state. That is, the infrared detection unit detects the actual distance between the user and the smart water dispenser in real time. When the actual distance is greater than or equal to the water getting distance, it shows that the user has left, and the single-chip microcomputer transmits the turn-off command to the electronic switch. Upon receiving the turn-off instruction, the electronic switch turns off. Similarly, step S34 in the foregoing embodiment may also include: when the timer starts, and it is determined that the timing of the timer reaches the preset time threshold, determining whether the mechanical switch is in the ON state, and outputting the voice signal if it is determined that the mechanical switch is in the ON state.

Figure 5:
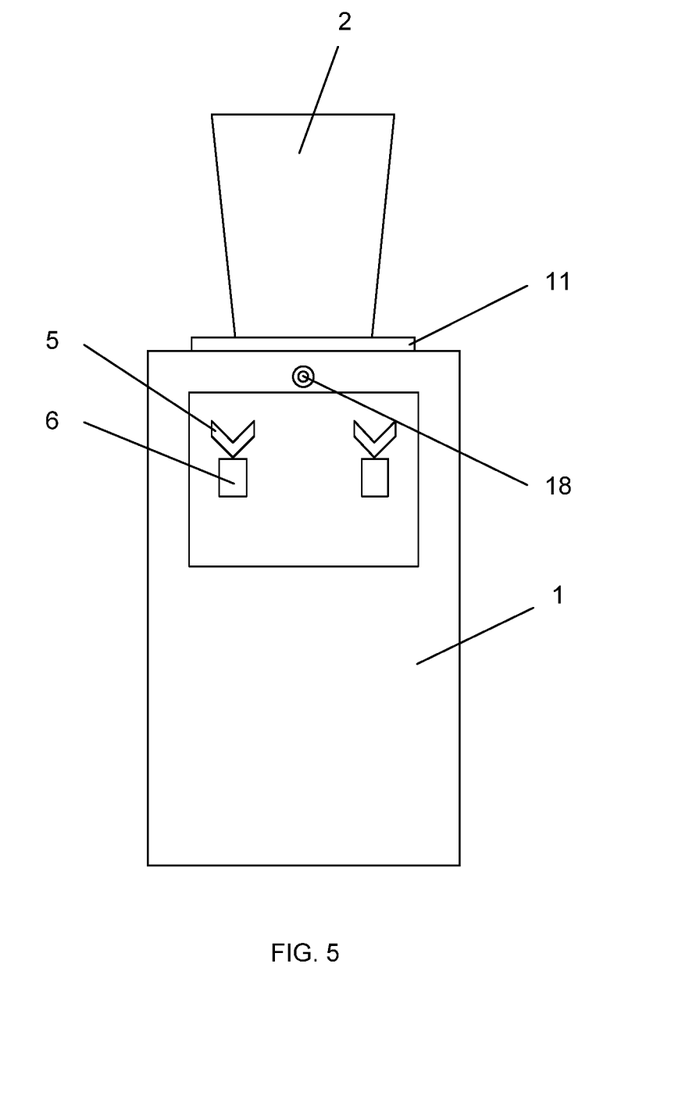
FIG. 5 is a schematic front view of a smart water dispenser according to the present disclosure.
Figure 6:
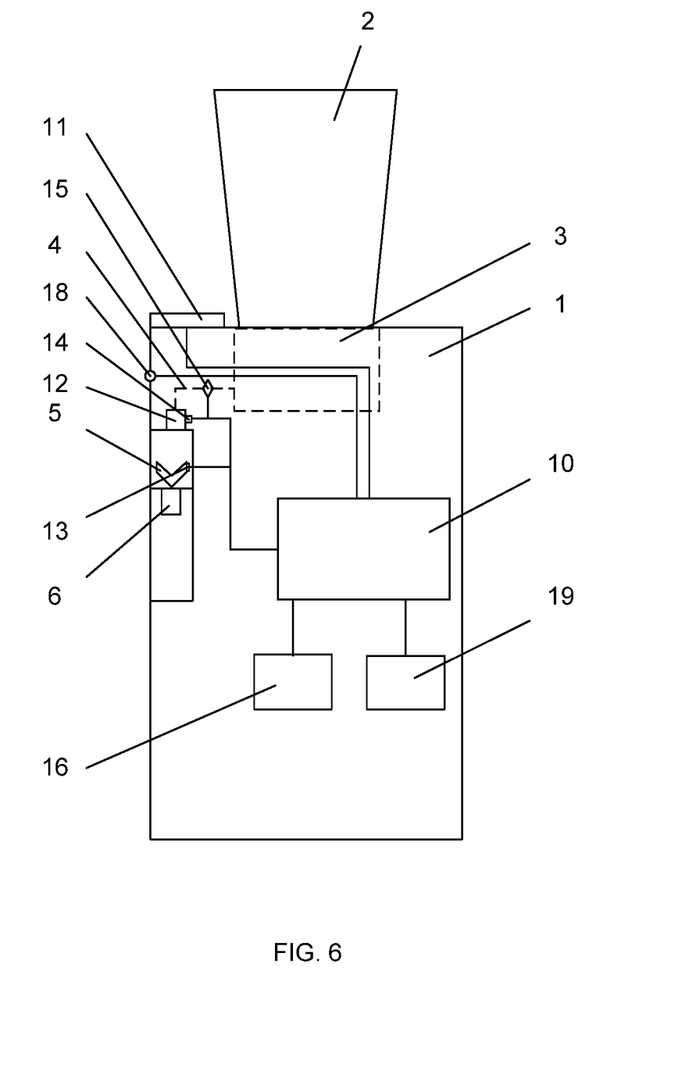
FIG. 6 is a schematic side view of a smart water dispenser according to the present disclosure.
Figure 7:
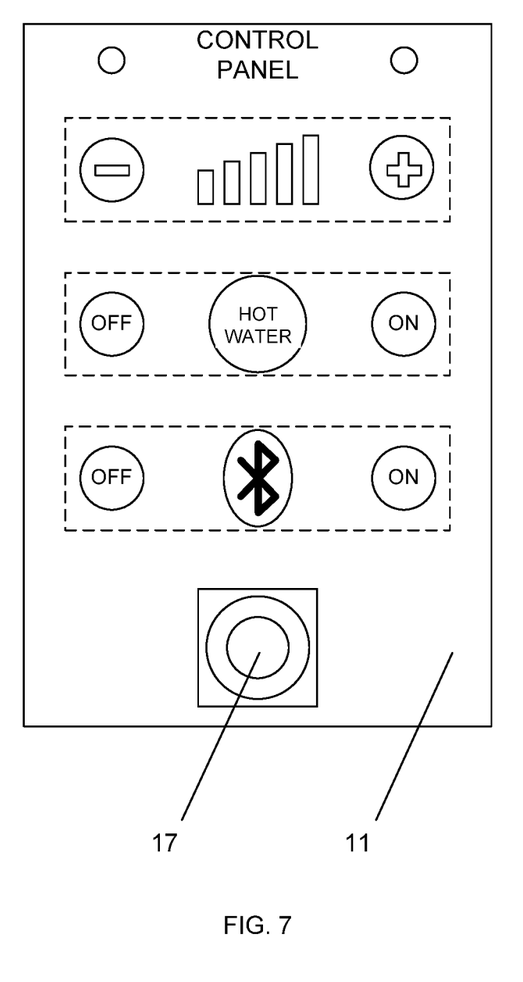
FIG. 7 is a schematic view of a control panel of a smart water dispenser according to the present disclosure.

FIG. 5 is a schematic front view of a smart water dispenser according to the present disclosure, FIG. 6 is a schematic side view of a smart water dispenser according to the present disclosure, and FIG. 7 is a schematic view of a control panel of a smart water dispenser according to the present disclosure. As shown in FIGS. 5 to 7, the smart water dispenser in this embodiment includes a body 1, a water source 2 arranged on the body, a water tank 3 arranged in the body 1 and in communication with the water source 2, a water outlet pipeline 4 in communication with the water tank 3, a mechanical switch 5 arranged on the water outlet pipeline 4, and a water outlet 6 in communication with the mechanical switch 5. Different from the structure of the traditional water dispenser, the smart water dispenser in this embodiment further includes a controller 10, a control panel 11, an electronic switch 12, a mechanical switch detection unit 13, an electronic switch detection unit 14, a water discharged detection unit 15, and a voice playback unit. 16.

The control panel 11 is arranged on the upper part of the body 1. An ON/OFF button is arranged on the control panel 11, and is connected to the electronic switch 12 for the user to control ON/OFF of the electronic switch 12. The electronic switch 12 is provided on the water outlet pipeline 4 and arranged between the mechanical switch 5 and the water tank 3, configured to control the water discharging from the water outlet 6 together with the mechanical switch 5. Since both the electronic switch 12 and the mechanical switch 5 are provided on the water outlet pipeline 4, the water outlet 6 can discharges water only if the two switches are turned on at the same time, and the water outlet 6 stops discharging water if any of the switches is turned off. The mechanical switch detection unit 13 is arranged on the mechanical switch 5, and configured to detect the ON/OFF state of the mechanical switch 5, and transmit the detection result to the controller 10. The electronic switch detection unit 14 is arranged on the electronic switch 12, and configured to detect the ON/OFF state of the electronic switch 12, and transmit the detection result to the controller 10. The water discharged volume detection unit 15 is provided on the water outlet pipeline 4 for collecting the volume of water flowing through the water outlet pipeline 4, that is, collecting the water discharged volume of the water outlet 6. The voice playback unit 16 is arranged in the body 1 or on the body 1 for playing the preset prompt voice. The control panel 11, the electronic switch 12, the mechanical switch detection unit 13, the electronic switch detection unit 14, the water discharged volume detection unit 15 and the voice playback unit 16 are all connected to the controller 10. The controller 10 is configured to determine whether the water usage is normal according to the ON/OFF states of the mechanical and the electronic switches; to indicate the water discharged volume detection unit 15 to collect the water discharged volume if it is determined that the water usage is normal; and to turn off the electronic switch 12 to stop water discharging and transmit the play instruction to the voice playback unit if it is determined that the water usage is abnormal.

The normal water usage process of the smart water dispenser in this embodiment is that the user first turns on the electronic switch 12, then turns on the mechanical switch 5, and the water outlet 6 starts to discharge water. During the water discharging process, if the user turns off any one of the electronic switch 12 and the mechanical switch 5, the water discharging is stopped. After the water discharging is stopped, the user needs to further turn off another switch. In particular, the user may control ON/OFF of the electronic switch 12 by pressing the ON/OFF button on the control panel 11, and may control ON/OFF of the mechanical switch 5 by pressing or pushing the mechanical switch 5.

Specifically, the controller 10 of this embodiment includes a detection module, a determination module, and a control module, wherein the detection module is connected to the mechanical switch detection unit and the electronic switch detection unit, respectively, and configured to receive the ON/OFF state of the mechanical switch transmitted by the mechanical switch detection unit and the ON/OFF state of the electronic switch transmitted by the electronic switch detection unit, and transmit the ON/OFF states of the mechanical switch and the electronic switch to the determination module; the determination module is connected to the detection module, and configured to determine whether the mechanical switch is in the ON state when the electronic switch is switched from the OFF state to the ON state; transmit an abnormal water usage instruction to the control module if it is determined that the mechanical switch is in the ON state; and if it is determined that the mechanical switch is in the OFF state, transmit a normal water usage instruction to the control module when the mechanical switch is switched from the OFF state to the ON state; the control module is connected to the determination module, the electronic switch and the water discharged volume detection unit, and configured to turn off the electronic switch upon receiving the abnormal water usage instruction transmitted by the determination module and transmit the play instruction to the voice playback unit; and transmit a collection instruction to the water discharged volume detection unit upon receiving the normal water usage instruction transmitted by the determination module.

In actual implementations, the controller of this embodiment may be a single-chip microcomputer, the mechanical switch may be a push-type or push-in type switch, the electronic switch may be an electromagnetic valve, the mechanical switch detection unit and the electronic switch detection unit may be detectors, the water discharged volume detection unit may be a flow detection unit, and the voice playback unit may be a speaker, which are not specifically limited herein. Upon receiving the play instruction of the controller, the voice playback unit starts playing the prompt voice, e.g., repeatedly playing "Mechanical Switch Is Not Turned Off", prompting the user that the mechanical switch needs to be turned off. Upon receiving the prompt, the user turns off the mechanical switch.

In actual implementations, the electronic switch may only be arranged on a hot water pipeline, or may be arranged on the hot water pipeline and a cold water pipeline respectively. The position of the control panel is set as long as it cannot be easily touched by children, also taking the convenience of users into account. Preferably, the control panel is arranged on the top surface of the body. In FIGS. 5 to 7, the positions of the controller, the electronic switch, the water discharged volume detection unit and the voice playback unit are merely illustrative, and can be designed according to the actual situations, which are not specifically limited herein.

The smart water dispenser in this embodiment ensures the security of using the smart water dispenser by introducing the electronic switch and intelligent control over the basic structure of the water dispenser. Specifically, by adding the electronic switch, both the electronic switch and the mechanical switch are provided on the water outlet pipeline, so that the water may be discharged only if the electronic switch and the mechanical switch both are turned on, and the water discharge is stopped when any one of the switches is turned off during the water discharge process. During the user's usage, he may manipulate any of the switches to stop the water discharging according to actual situations, solving the possible problem that the switch of the traditional water dispenser is not turned off in time and preventing the user from being scalded due to overflow of hot water effectively. Also, the ON/OFF button for turning on/off the electronic switch is arranged on the control panel, and the control panel is arranged at a higher position of the smart water dispenser and cannot be touched by children, solving the problem that the switch of the traditional water dispenser is easy to be misoperated by children, and preventing the children from being scalded due to misoperation of the children. Further, the electronic switch and the mechanical switch have a preset turn-on order, and the water may be discharged normally only with the order of turning on the electronic switch first and then the mechanical switch. Even if a child may touch the mechanical switch, the water will not be discharged due to the inconsistent turn-on order of the switches, ensuring that the hot water may not flow out easily and avoiding the danger of scalding children maximally. Even further, in this embodiment, the states of the two switches are detected in real time, so that not only turning on the electronic switch is invalid and there is no hot water flowing out in the case that the mechanical switch is not turned off, but also the user may be prompted to turn off the mechanical switch in time to ensure the security of the user.

According to another embodiment which is an extension of the foregoing embodiment of the smart water dispenser, the smart water dispenser further includes a fingerprint recognition unit 17, which is connected to the controller. When a finger presses on the fingerprint recognition unit 17, the fingerprint recognition unit 17 collects fingerprint data of the finger and transmits the collected fingerprint data to the controller. The controller compares the collected fingerprint data with a pre-entered fingerprint template, and transmits an activation instruction to the electronic switch when the collected fingerprint data match the pre-entered fingerprint template, and the electronic switch switches from a sleep mode to a working mode.

Specifically, the fingerprint recognition unit is connected to the determination module in the controller, and configured to collect fingerprint data of a finger and transmit the collected fingerprint data to the determination module.

The determination module is connected to the fingerprint recognition unit, and configured to receive the collected fingerprint data from the fingerprint recognition unit, compare the collected fingerprint data with the pre-entered fingerprint template, and transmit matching success message to the control module when the collected fingerprint data match the pre-entered fingerprint template, and transmit matching failure information to the control module when the collected fingerprint data do not match the pre-entered fingerprint template; the control module is connected to the determination module and the electronic switch, and configured to activate the electronic switch upon receiving the matching success information, and transmit the play instruction upon receiving the matching failure information.

In this embodiment, the smart water dispenser is further provided with a communication module 19. The communication module 19 is configured to establish a communication connection with the mobile terminal of the user, so that the user may set the controller by the mobile terminal accordingly. For example, the communication module is connected to the determination module in the controller and configured to transmit the pre-entered fingerprint template to the determination module for storage. In actual implementations, the communication module may use Bluetooth or WIFI.

In this embodiment, the fingerprint recognition unit 17 may be arranged on the control panel 11 to facilitate the user's operation. In addition, a temperature adjustment button (temperature increase/decrease), an ON/OFF button (on/off), a Bluetooth button (on/off), a power indicator light, and a buzzer etc. may be set on the control panel 11 as shown in FIG. 7.

According to another embodiment which is an extension of the foregoing embodiments of the smart water dispenser, the smart water dispenser further includes an infrared detection unit 18. The infrared detection unit 18 is arranged on the body, and configured to detect whether the user leaves the smart water dispenser. The infrared detection unit 18 is connected to the controller.

Specifically, the infrared detection unit is connected to the determination module in the controller, and configured to detect the actual distance between the user and the smart water dispenser in real time, and transmit the actual distance to the determination module. Moreover, the water discharged volume detection unit is connected to the determination module in the controller, and configured to collect the volume of water flowing through the water outlet pipeline in real time during the water discharging process, and transmit the volume of water to the determination module.

The determination module is connected to the water discharged volume detection unit, and configured to receive the collected water discharged volume from the water discharged volume detection unit, compare the collected water discharged volume with a preset water discharged threshold, and transmit water getting completion information to the control module when the collected water discharged volume is greater than or equal to the water discharged threshold; and the determination module is also connected to the infrared detection unit and configured to compare the detected actual distance with a preset water getting distance, and determine whether the mechanical switch is in the ON state when the actual distance is greater than or equal to the water getting distance, and transmit leaving information to the control module if it is determined that the mechanical switch is in the ON state.

The control module is connected to the determination module, the electronic switch and the voice playback unit, and configured to turn off the electronic switch upon receiving the water getting completion information transmitted by the determination module, and transmit the play instruction to the voice playback unit upon receiving the leaving information transmitted by the determination module.

In this embodiment, the setting and the transmission of the water discharged threshold and the water getting distance are the same as those in the foregoing embodiments, and are not described herein again. Similarly, in this embodiment, the water discharged volume is controlled by setting the water discharged threshold, which may prevent overflow of the hot water caused by the user's negligence and may also avoid overflow of the hot water caused by the switch being not turned off in time. Meanwhile, by configuring the infrared detection unit, successful turn-off of the mechanical switch may be achieved, which eliminates the potential security risk caused by the user's negligence.

According to another embodiment which is an extension of the foregoing embodiments of the smart water dispenser, the smart water dispenser further includes a timer. The timer is connected to the controller and configured to accumulate the time elapsed after the mechanical switch is turned off, and transmit the accumulated time to the controller.

Specifically, the timer is connected to the control module in the controller and configured to start upon receiving the timing instruction transmitted by the control module; the timer is also connected to the determination module in the controller and configured to transmit the accumulated time to the determination module.

The determination module is connected to the timer and configured to receive the accumulated time from the timer, compare the accumulated time with the preset time threshold, determine whether the electronic switch is in the ON state when the accumulated time is greater than or equal to the time threshold, and transmit delay information to the control module if it is determined that the electronic switch is in the ON state.

The control module is connected to the determination module and the electronic switch, and configured to turn off the electronic switch upon receiving the delay information transmitted by the determination module; the control module is also connected to the timer and configured to transmit the timing instruction to the timer when it is determined that the mechanical switch is switched from the ON state to the OFF state.

Similarly, this embodiment achieves automatic turn-off of the electronic switch by setting the timer. When the mechanical switch has been off for more than a predetermined time, the electronic switch is automatically turned off. On one hand, the operation of the user turning off the electronic switch may be simplified, and on the other hand, the potential security risk caused by the user's negligence may be prevented.

In the description of the embodiments of the present disclosure, it should be understood that an orientation or positional relationship indicated by the terms "middle", "upper", "lower", "front", "back", "vertical", "horizontal", "top", "bottom", "inner", "outside", and the like being based on the orientation or positional relationship as shown in the drawings is only for ease of description of the present disclosure and simplifying the description, but does not indicate or imply that the device or component as mentioned must have such a particular orientation, be constructed and operate in such a particular orientation, which thus should not to be construed as a limitation of the present disclosure.

In the description of the embodiments of the present disclosure, it should be noted that the terms "mounted", "connected", and "coupled" should be interpreted broadly unless specifically defined or limited otherwise. For example, it may be a fixed connection or a removable connection or an integral connection; and may be a mechanical connection or an electrical connection; may be a direct connection, or a indirectly connection through an intermediary; may be internal communication of two components. For the skilled in the art, the specific meanings of the above terms in the present disclosure can be understood in specific situations.

The skilled in the art should understand that the embodiments of the present disclosure may be provided as a method, a system, or a computer program product. Thus, the disclosure may take the form of an entire hardware embodiment, an entire software embodiment, or an embodiment combining software and hardware aspects. Moreover, the present disclosure may take the form of a computer program product embodied on one or more computer-usable storage media (including but not limited to a disk storage, an optical storage, etc.) having computer-usable program code embodied therein.

The present disclosure is described with reference to the flowcharts and/or block diagrams of methods, devices, and computer program products according to embodiments of the present disclosure. It should be understood that each process and/or block in the flowcharts and/or block diagrams, and combinations of the processes and/or blocks in the flowcharts and/or block diagrams may provide these computer program requests to a processor of a general purpose computer, a special purpose computer, an embedded processor, or other programmable information processing device to generate a machine, so that means for implementing specific functions in one or more processes in the flowchart and/or one or more blocks in the block diagram may be generated by the requests executed by the processor of the general purpose computer or other programmable information processing device.

These computer program requests may also be stored in a computer readable memory capable of directing a computer or other programmable information processing device to operate in a particular manner, so that the request stored in the computer readable memory produces an article including the requesting means. The requesting means implement the functions specified in one or more processes in the flowchart and/or one or more blocks in the block diagram.

These computer program requests may also be loaded onto a computer or other programmable information processing device such that a series of operational steps are performed on the computer or other programmable device to generate computer-implemented processes for execution on a computer or other programmable device. The request provides steps for implementing the functions specified in one or more blocks of a flowchart or a plurality of flowcharts and/or block diagrams of the flowchart.

Although the embodiments disclosed herein are as described above, the contents described are merely implementations for facilitating understanding of the present document and are not intended to limit the present disclosure. Any person skilled in the art to which the present disclosure belongs may make any modifications and changes in forms and details of implementation without departing from the spirit and scope disclosed herein. However, the protection scope of the present disclosure is defined by the appended claims.

We claim:

1. A smart water dispenser comprising:
   a mechanical switch;
   an electronic switch arranged on a water outlet pipeline;
   a mechanical switch detection unit configured to detect an ON/OFF state of the mechanical switch and transmit a detection result to a controller; and
   an electronic switch detection unit configured to detect an ON/OFF state of the electronic switch and transmit a detection result to the controller;
   wherein the controller is connected to the electronic switch, the mechanical switch detection unit and the electronic switch detection unit, and is configured to determine whether water usage is normal according to the ON/OFF states of the mechanical and the electronic switches, and to turn off the electronic switch if it is determined that the water usage is abnormal.

2. The smart water dispenser according to claim 1, wherein the controller comprises a detection module, a determination module and a control module; and
   wherein the detection module is connected to the mechanical switch detection unit and the electronic switch detection unit, respectively, and configured to receive the ON/OFF states transmitted by the mechanical switch detection unit and the electronic switch detection unit; and
   wherein the determination module is connected to the detection module and configured to determine whether the mechanical switch is in the ON state when the electronic switch is switched from the OFF state to the ON state; transmit an abnormal water usage instruction to the control module if it is determined that the mechanical switch is in the ON state; and if it is determined that the mechanical switch is in the OFF state, transmit a normal water usage instruction to the control module when the mechanical switch is switched from the OFF state to the ON state; and
   wherein the control module is connected to the determination module and the electronic switch, and configured to turn off the electronic switch upon receiving the abnormal water usage instruction.

3. The smart water dispenser according to claim 2, further comprising:
   a fingerprint recognition unit connected to the determination module and configured to collect fingerprint data and transmit the collected fingerprint data to the determination module;
   wherein the determination module is configured to compare the collected fingerprint data with a pre-entered fingerprint template, transmit matching success information to the control module when the collected fingerprint data matches the pre-entered fingerprint template, and transmit matching failure information to the control module when the collected fingerprint data does not match the pre-entered fingerprint template; and
   wherein the control module is configured to activate the electronic switch upon receiving the matching success information, and transmit a play instruction to a voice playback upon receiving the matching failure information.

4. The smart water dispenser according to claim 2, wherein the control module is configured to indicate a water discharged volume detection unit to collect a water discharged volume upon receiving the normal water usage instruction.

5. The smart water dispenser according to claim 4, wherein:
   the water discharged volume detection unit is connected to the determination module, configured to collect a volume of water flowing through the water outlet pipeline in real time during a water discharge process as the water discharged volume, and transmit the water discharged volume to the determination module;

the determination module is connected to the water discharged volume detection unit and configured to compare the collected water discharged volume with a preset water discharged threshold, and transmit water getting completion information to the control module when the collected water discharged volume is greater than or equal to the water discharged threshold; and the control module turns off the electronic switch upon receiving the water getting completion information.

6. The smart water dispenser according to claim 4, further comprising:

an infrared detection unit connected to the determination module, configured to detect an actual distance between a user and the smart water dispenser in real time, and transmit the actual distance to the determination module;

wherein the determination module is connected to the infrared detection unit and configured to compare the detected actual distance with a preset water getting distance, and determine whether the mechanical switch is in the ON state when the actual distance is greater than or equal to the water getting distance, and transmit leaving information to the control module if it is determined that the mechanical switch is in the ON state; and wherein the control module transmits a play instruction to a voice playback unit upon receiving the leaving information if the determination module determines that the mechanical switch is in the ON state.

7. The smart water dispenser according to claim 2, further comprising:

a timer connected to the control module and configured to start upon receiving a timing instruction transmitted by the control module, and also connected to the determination module and configured to transmit an accumulated time to the determination module;

wherein the determination module is configured to compare the accumulated time with a preset time threshold, and determine whether the electronic switch is turned on when the accumulated time is greater than or equal to the time threshold, and transmit delay information to the control module if it is determined that the electronic switch is turned on; and wherein the control module is configured to turn off the electronic switch upon receiving the delay information, and transmit the timing instruction to the timer when it is determined that the mechanical switch is switched from the ON state to the OFF state.

8. The smart water dispenser according to claim 1, wherein the controller is configured to transmit a play instruction to a voice playback unit if it is determined that the water usage is abnormal.

9. A control method of a smart water dispenser, wherein the smart water dispenser comprises a mechanical switch and an electronic switch arranged on a water outlet pipeline, the control method comprising:

detecting, by a mechanical switch detection unit of the smart water dispenser, an ON/OFF state of the mechanical switch and transmitting a detection result to a controller of the smart water dispenser;

detecting, by an electronic switch detection unit of the smart water dispenser, an ON/OFF state of the electronic switch and transmitting a detection result to the controller;

determining, by the controller, whether the mechanical switch is in an ON state when the electronic switch is switched from an OFF state to an ON state; and turning off the electronic switch if it is determined that the mechanical switch is in the ON state.

10. The control method according to claim 9, wherein the smart water dispenser further comprises a fingerprint recognition unit, and wherein before the states of the mechanical switch and the electronic switch are detected in real time, the control method further comprises:

collecting, by the fingerprint recognition unit, fingerprint data and transmitting the collected fingerprint data to the controller, comparing, by the controller, the collected fingerprint data with a pre-entered fingerprint template;

activating, by the controller, the electronic switch when the collected fingerprint data match the pre-entered fingerprint template; and transmitting, by the controller, a play instruction to a voice playback when the collected fingerprint data do not match the pre-entered fingerprint template.

11. The control method according to claim 9, wherein the method further comprises:

indicating, by the controller, a water discharged volume detection unit to collect a water discharged volume when the mechanical switch is switched from the OFF state to the ON state.

12. The control method according to claim 11, wherein the smart water dispenser further comprises the water discharger volume detection unit, and wherein the control method further comprises:

collecting, by the water discharger volume detection unit, a volume of water flowing through the water outlet pipeline in real time during a water discharge process as the water discharged volume, and transmitting the water discharged volume to the controller;

comparing, by the controller, the collected water discharged volume with a preset discharged threshold; and turning off, by the controller, the electronic switch when the collected water discharged volume is greater than or equal to the preset water discharged threshold.

13. The control method according to claim 12, wherein the smart water dispenser further comprises an infrared detection unit, and wherein the method further comprises:

detecting, by the infrared detection unit, an actual distance between a user and the smart water dispenser in real time, and transmitting the actual distance to the controller;

comparing, by the controller, detected actual distance with a preset water getting distance, and determining whether the mechanical switch is in the ON state when the actual distance is greater than or equal to the water getting distance; and transmitting, by the controller, a play instruction to a voice playback unit if it is determined that the mechanical switch is in the ON state.

14. The control method according to claim 11, wherein the smart water dispenser further comprises a timer; and wherein the control method further comprises:

starting, by the controller the timer when the mechanical switch is switched from the ON state to the OFF state;

comparing, by the controller, an accumulated time of the timer with a preset time threshold, and determining whether the electronic switch is in the ON state when the accumulated time is greater than or equal to the time threshold; and turning off, by the controller, the electronic switch if it is determined that the electronic switch is in the ON state.

15. The control method according to claim 9, further comprising:
transmitting, by the controller, a play instruction to a voice playback unit if it is determined that the mechanical switch is in the ON state.

* * * * *